US005589022A

United States Patent [19]
Kuwahara

[11] Patent Number: 5,589,022
[45] Date of Patent: Dec. 31, 1996

[54] METHOD OF MANUFACTURING EMBLEM OF THERMOPLASTIC SYNTHETIC RESIN SHEET

[76] Inventor: Eiji Kuwahara, Omiya Mansion, No. 25-18, Nakamiya 2-chome, Asahi-ku, Osaka-shi, Osaka-fu, Japan

[21] Appl. No.: 465,106

[22] Filed: Jun. 5, 1995

[30] Foreign Application Priority Data

Feb. 6, 1995 [JP] Japan ..................... 7-039445

[51] Int. Cl.⁶ ............................. B32B 3/02; B32B 15/08
[52] U.S. Cl. .................. 156/231; 156/233; 156/240; 156/267; 264/163
[58] Field of Search .................... 156/230, 231, 156/233, 238, 239, 240, 244.19, 244.25, 267, 268, 251; 264/132, 163

[56] References Cited

U.S. PATENT DOCUMENTS

| | | |
|---|---|---|
| 3,629,034 | 12/1971 | Nishizawa . |
| 3,916,046 | 10/1975 | Youngberg . |
| 4,130,623 | 12/1978 | Walter . |
| 4,275,099 | 6/1981 | Dani ........................ 156/331 |
| 4,278,483 | 7/1981 | Mansolillo . |
| 4,535,024 | 8/1985 | Parker ...................... 156/233 |
| 4,555,423 | 11/1985 | Sands . |
| 4,868,033 | 9/1989 | Nakano et al. ............ 156/233 |
| 5,120,589 | 6/1992 | Morikawa et al. . |
| 5,143,672 | 9/1992 | Kuwahara ................. 264/134 |
| 5,520,988 | 5/1996 | Kuwahara ................. 428/205 |

FOREIGN PATENT DOCUMENTS

| | | |
|---|---|---|
| 0587403 | 3/1994 | European Pat. Off. . |
| 43-15353 | 6/1968 | Japan . |
| 49-980 | 1/1974 | Japan . |
| 49-27421 | 3/1974 | Japan . |
| 50-35992 | 4/1975 | Japan . |
| 50-35993 | 4/1975 | Japan . |
| 51-26235 | 3/1976 | Japan . |
| 54-43180 | 4/1979 | Japan . |
| 54-70402 | 6/1979 | Japan . |
| 57-60160 | 4/1982 | Japan . |
| 58-180689 | 10/1983 | Japan . |
| 59-115900 | 7/1984 | Japan . |
| 2-145320 | 6/1990 | Japan . |
| 4-001032 | 1/1992 | Japan . |
| 5-305799 | 11/1993 | Japan ...................... 156/233 |
| 2224237 | 5/1990 | United Kingdom . |

Primary Examiner—Jill L. Heitbrink
Attorney, Agent, or Firm—Oliff & Berridge

[57] ABSTRACT

The object of the present invention is to provide a method of manufacturing an emblem in which high frequency induction heating is applied to a soft thermoplastic synthetic resin film such as a thermoplastic PVC film including a metal vapor deposition film and a polyurethane film. By a polyurethane film, the metal vapor deposition film is not damaged by hydrogen chloride gas or chlorine gas generated during the process of manufacturing the emblem by means of high frequency induction heating.

12 Claims, 1 Drawing Sheet

METHOD OF MANUFACTURING EMBLEM OF THERMOPLASTIC SYNTHETIC RESIN SHEET

BACKGROUND OF THE INVENTION

This invention relates to a method of manufacturing an emblem comprising a thermoplastic synthetic resin sheet that can suitably be used for an automobile, a motor boat, an office automation apparatus, a home electric appliance, a sporting product, a stationery product, a bag or a textile product.

Known techniques for manufacturing an emblem made of a thermoplastic synthetic resin sheet and used as a sticker or the like include those disclosed in Japanese Patent Laid-Open No. 2-145320 and Japanese Patent Publication No. 57-60160.

With known technique, in order to produce a brightly shining effect, a metal vapor deposition film is used in addition to a thermoplastic PVC film and the emblem is manufactured by high frequency induction. In such a case, the metal vapor deposition film is oxidized and corroded by hydrogen chloride gas and chlorine gas which are produced in the high frequency induction, to lose its shining effect. Additionally, sparks occurs in the course of processing operations to degrade the quality of the emblem.

A hard synthetic resin product carrying a plated metal film or a metal vapor deposition film is often used for an emblem of the type under consideration in order to increase the adaptability to a curved surface of the object such as an automobile, a motor bicycle, a home electric appliance or the like, and prevent it from losing its shining effect. However, such prior art requires the use of a specifically designed mold for every different radius of curvature, and increases the manufacturing cost.

SUMMARY OF THE INVENTION

Therefore, it is an object of the invention to provide a method of manufacturing an emblem made of a thermoplastic synthetic resin sheet including a metal vapor deposited film to make it brightly shine, which emblem being adapted to any curved surface without difficulty. According to the method, such emblem can be prepared by a simple technique of high frequency induction molding without losing its brightly shining effect.

According to the invention, the above object is achieved by providing a method of manufacturing an emblem comprising steps of: arranging a composite sheet on a pole plate of an electrode die for high frequency induction, said composite sheet comprising a pattern sheet, a back-up layer of thermoplastic synthetic resin arranged under the pattern sheet, a tacky adhesion layer arranged under said pattern sheet, a releasing paper sheet arranged under said tacky adhesion layer and a highly heat-resistant transparent carrier film, said pattern sheet comprising a transparent polyurethane film, a metal vapor deposition film formed under a lower surface of said transparent polyurethane film and a polyurethane film arranged under a lower surface of said metal vapor deposition film to cover said metal vapor deposition film; pressing and heating said composite sheet from above by means of an engraving die to fusion-cut said pattern sheet and said back-up layer between said carrier film and said releasing paper sheet at least along the outer boundary of the pattern and weld them together; peeling off either said carrier film or said releasing paper sheet; removing an unnecessary areas of the pattern; and bonding the peeled off carrier film or releasing paper sheet again.

More particularly, according to the invention, a composite sheet is prepared as follows. A metal vapor deposition film is formed on the lower surface of a transparent polyurethane film, and is covered with an another polyurethane film arranged under the metal vapor deposition film. A pattern sheet comprises the transparent polyurethane film, the metal vapor deposition film and the another polyurethane film. A back-up layer of thermoplastic synthetic resin such as a thermoplastic PVC sheet is arranged under the pattern sheet. An adhesion layer and a releasing paper sheet are arranged under the back-up layer. A heat-resistant transparent carrier film which is made of, for example, polypropylene film, is tackily adhered to an upper surface of the transparent carrier film. Due to these operations, the composite sheet is formed.

Then, the composite sheet is arranged on a pole plate of an electrode die for high frequency induction, and pressed and heated from above by means of an engraving die to fusion-cut the pattern sheet and the back-up layer between the carrier film and the releasing paper sheet at least along the outer boundary of the pattern and weld them together.

Then, either the carrier film or the releasing paper sheet is peeled off. An unnecessary portion is removed. Then, the the peeled off carrier film or the releasing paper sheet is again applied.

According to the present invention, any hydrogen chloride gas or chlorine gas that may be generated when the thermoplastic PVC sheet of the back-up layer is welded by high frequency induction heating can be effectively prevented from escaping by the polyurethane films arranged on and under the metal vapor deposition film so that the metal vapor deposition film may not be oxidized nor corroded and can maintain its brightly shining effect for a prolonged period of time.

The carrier film and the releasing paper sheet are not fusion-cut by the engraving die when they are pressed and heated by high frequency induction. The pattern sheet and the back-up layer are fusion-cut by a fusion-cutter arranged at least along the outer boundary of the pattern. The carrier film and the releasing paper sheet are welded together.

The polyurethane film with the metal vapor deposition film shows a raised profile, because the back-up layer is expanded.

Then, either the carrier film or the releasing paper sheet is peeled off. An unnecessary portion of the pattern sheet which is not formed with an pattern is removed. Also, an unnecessary portion of the back-up layer is removed. The peeled off carrier film or releasing paper sheet is applied again to produce a finished emblem.

The emblem can be bonded to an object such as an automobile simply by peeling off the releasing paper sheet is, visually positioning the emblem in place through the transparent polyurethane film and removing the carrier film. The emblem is held in place without losing its brightly shining effect for a prolonged period of time.

In a preferred embodiment, an engraved pattern or an undulated pattern such as aventurine lacquer, wave pattern may be formed in advance on the transparent polyurethane film under which a metal vapor deposition film is formed in a later stage. A visually sophisticated emblem having a light scattering and brightly shining effect can be obtained.

Alternatively, according to another preferred embodiment, the undulated pattern on upper surface of the transparent polyurethane film may be Formed by pressing and heating the film with an engraving die. According to this embodiment, the operation of fusion-cutting and welding the pattern sheet and the back-up layer and that of Forming an undulated pattern on the upper surface of the polyurethane film are carried out simultaneously in a single step.

In still another preferred embodiment, the back-up layer may be made only of a thermoplastic PVC film. According to this embodiment, the surface of the emblem is relatively flat and the emblem is not relatively bulky.

Alternatively, in still another preferred embodiment of the invention, the back-up layer may be made only of a thermoplastic foamed PVC sheet. The surface of the emblem is gently curved and the emblem is not relatively bulky.

Still alternatively, in still another embodiment, the backup layer may comprise an upper layer of a thermoplastic PVC film and a lower layer of a thermoplastic foamed PVC sheet. The emblem is bulky and the surface of the emblem is flat.

Still alternatively, in still another preferred embodiment, the back-up layer may comprise an upper layer of a thermoplastic foamed PVC sheet and a lower layer of a thermoplastic PVC film. The emblem is bulky and the surface of the emblem is gently curved.

In still another preferred embodiment of the present invention, the adhesion layer formed under the back-up layer may be a tacky adhesive sheet. The emblem can be securely adhered to a curved surface of the object made of metal, synthetic resin etc. without difficulty.

Alternatively, in still another preferred embodiment, the adhesion layer may be a hot melt film. The emblem can be adhered to an object made of textile, synthetic leather, or PVC leather etc.

In still another preferred embodiment, an urethane type hot melt film may be arranged between the pattern sheet and the back-up layer. According to this embodiment, any hydrogen chloride gas or chlorine gas generated during the process of high frequency induction heating can be effectively blocked from permeating the component layers of the emblem.

PREFERRED EMBODIMENT OF THE INVENTION

Figure 1:
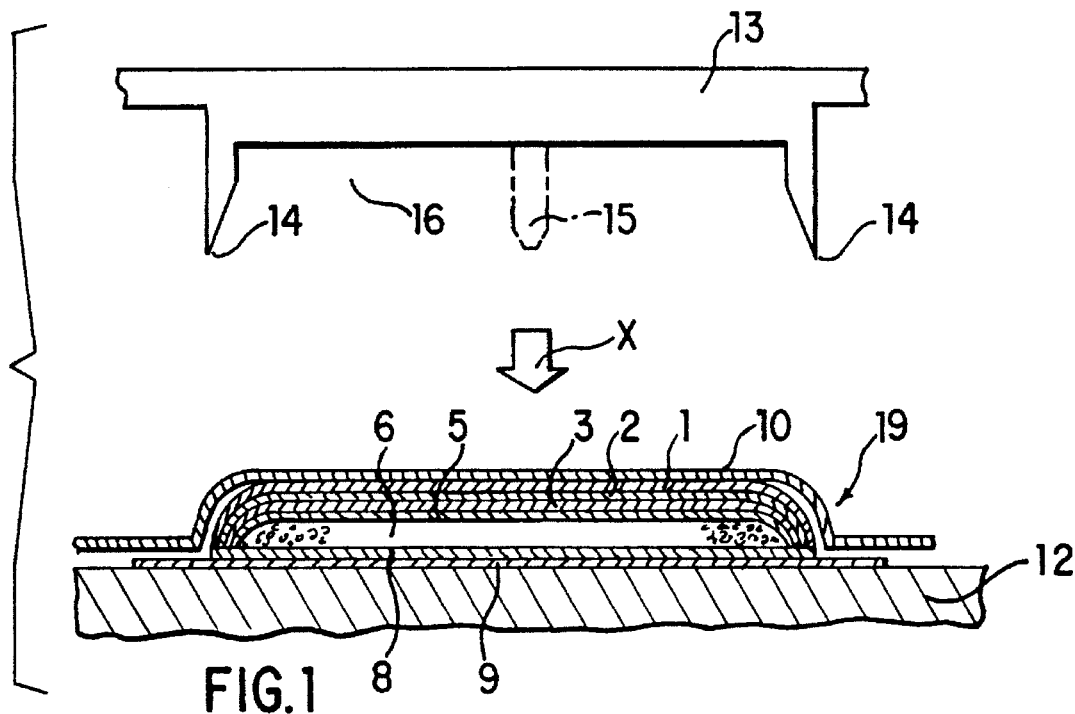
FIG. 1 is a schematic cross sectional view of an emblem manufactured by a method according to the invention.
Figure 2:
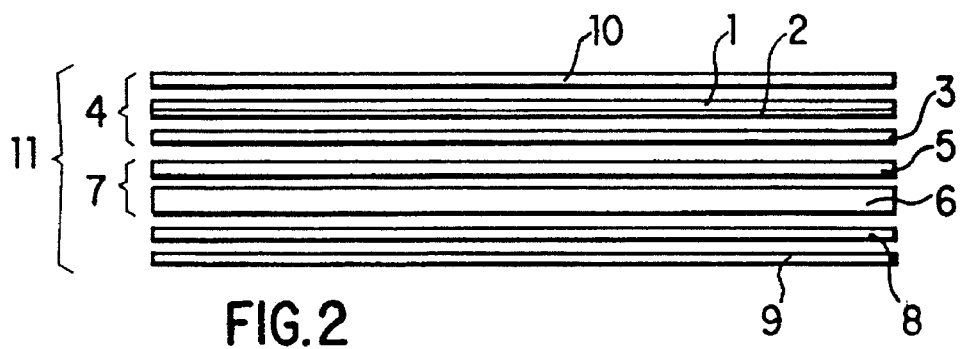
FIG. 2 is a schematic illustration showing the multilayer structure of a composite sheet that can be used for the purpose of the invention.
Figure 3:
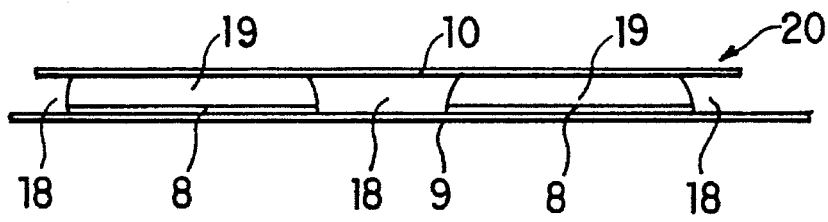
FIG. 3 is a schematic sectional view of an arrangement of emblems manufactured by a method according to the invention.

FIGS. 1, 2 and 3 schematically illustrates a preferred embodiment of the invention.

Referring to FIG. 2, a pattern sheet 4 comprises a transparent polyurethane film 1, a metal vapor deposition film 2 and a polyurethane film 3. The metal vapor deposition film 2 is formed on a lower surface of the transparent polyurethane film 1. A lower surface of the metal vapor deposition film 2 is covered with the polyurethane film 3. In the preferred embodiment, an aluminum vapor deposition film is used, but aluminum may be replaced by chromium or some other appropriate metal for vapor deposition. As the transparent polyurethane film 1, the urethane film F4875 of SEIKO KABUSIKI KAISHA may be used, but the present invention is not limited to this film. As the polyurethane film 3, thermal adhesive film "ELPHAN" (Trade name of NIHON MATAI KABUSHIKI KAISHA) or "ESMER" (Trade name of NIHON MATAI KABUSHIKI KAISHA) may be used, but the present invention is not limited to these films.

Then, a back-up layer 7 comprises a thermoplastic PVC sheet 5 and a thermoplastic foamed PVC sheet 6. The thermoplastic PVC sheet 5 is arranged under the pattern sheet 4 and in turns the thermoplastic foamed PVC sheet 6 is arranged under the thermoplastic PVC sheet 5.

Thereafter, a tacky adhesion layer 8 and a releasing paper sheet 9 are sequentially arranged under the back-up layer 7. The tacky adhesion layer 8 tackily adheres the releasing paper sheet 9 and thus the releasing paper sheet 9 is detachably adhered to the back-up layer 7. Also, with this adhesion layer 8, the backup layer 7 can be adhered to the object.

A highly heat-resistive carrier film 10 is tackily bonded to the upper surface of said transparent polyurethane film 1. In the preferred embodiment, the carrier film 10 is made of transparent polypropylene.

A composite sheet 11 has a multilayer structure and comprises the carrier film 10, the pattern sheet 4, the back-up layer 7, the tacky adhesion layer 8, and the releasing paper sheet 9.

The composite sheet 11 may be formed by sequentially arranging the carrier film 10, the pattern sheet 4, the back-up layer 7, the tacky adhesion layer 8, and the releasing paper sheet 9 on a pole plate 12 (FIG. 1) of an electrode die for high frequency induction. Alternatively, the carrier films, the pattern sheet 4, the back-up layer 7, the tacky adhesion layer 8, and the releasing paper sheet 9 are adhered in advance to form the composite sheet 11 and such composite sheet 11 may be placed on the pole plate 12.

After placing a composite sheet 11 on a pole plate 12, an engraving die 13 that operates as the other electrode of the electrode die for high frequency induction presses the composite sheet 11 against the pole plate 12 in a direction as indicated by arrow in FIG. 1 and then a high frequency wave is applied thereto to heat the composite sheet 11.

The engraving die 13 is provided with a fusion cutter 14 along an outer boundary of the pattern of the emblem. One or more pressing cutters 15 may be arranged to produce an intended pattern depending on the contour of the pattern or design. The engraving die 18 is provided with a recess 16 for receiving the projected portion of the emblem. Since the composite sheet 11 is heated, the back-up layer 7 is expanded in the recess 16.

Due to the high frequency wave and and the pressing by the engraving die 13, the pattern sheet 4 and the back-up layer 7 between the carrier film 10 and the releasing paper sheet 9 are fusion-cut by the fusion cutter 14 and also by the pressing cutters 15, if such pressing cutters are used, and welded to bond each other along the cutters so that the aluminum vapor deposition film 2 and the urethane films 1 and 3 has smoothly curved surface.

In this case, the carrier film 10 and the releasing paper sheet 9 are not fusion-cut by the application of a high frequency wave and the operation of pressing and heating the engraving die 13.

Because the back-up layer 7 is expanded by the high-frequency heating, the composite sheet 11 shows a relatively bulky profile and a relatively smooth surface (in other words, three dimensional pattern or emblem) in areas surrounded by the fusion cutter 14 and the press cutters 15.

When the composite sheet is cooled after the operation of pressing and heating of the engraving die 13, either the carrier film 10 or the releasing paper sheet 9 is peeled off from the composite sheet 11, and then an unnecessary portion 18 of the pattern 19 of the composite sheet 11 is removed. In the case of the composite sheet of the illustrated embodiment, since a tacky tape is used for the adhesion layer 8 is not easy to handle it in view of the operation efficiency, the carrier film 10 is removed in order to avoid to expose the tacky tape 8. Then, the unnecessary portion 18 is removed and the carrier film 10 is tackily adhered to completely produce an emblem 20 as shown in FIG. 3.

When the emblem 20 is applied onto an object such as an automobile, the releasing paper 9 is peeled off and the remaining multilayer structure of the emblem 20 is positioned in place and pressed against the object. An accurate positioning of the emblem can be achieved by viewing it through the transparent carrier film 10. Then, the transparent carrier film 10 is removed.

A hot melt film may be used as the adhesion layer. If the adhesion layer is a hot melt film, the releasing paper sheet 9 may alternatively be peeled off to remove the unnecessary portion 18 to improve the efficiency of the manufacturing process because the hot melt film is not tacky.

An undulated pattern may be formed in advance on an upper surface of the transparent polyurethane film 1 formed with the metal vapor deposition film 2 thereunder. With such embodiment, an emblem having a highly complicated pattern may be obtained.

Alternatively, if the undulated pattern is formed on the upper surface of the transparent polyurethane film 1 simultaneously at the time of the operation of pressing and heating of the engraving die 13, the above described step of forming an undulated pattern can be omitted.

The back-up layer 7 of the thermoplastic synthetic resin may comprise only the thermoplastic PVC sheet 5. In the case that the back-up layer 7 comprises only a thermoplastic PVC sheet 5 (in other words, the roamed sheet 6 is omitted), an emblem having a height relatively lower than that of FIG. 1 may be produced.

Alternatively, the back-up layer 7 of the thermoplastic synthetic resin may comprise only the thermoplastic foamed sheet 6. In such a case (in other words, the thermoplastic PVC sheet 5 is omitted), the surface of the emblem will be more smooth. Also, the height of the emblem will be relatively lower than that of FIG. 1, because there is no thermoplastic PVC sheet 5 which has shape retention.

Still alternatively, the thermoplastic foamed sheet 5 may be arranged under the thermoplastic PVC sheet 6. If the back-up layer 7 comprises the thermoplastic PVC sheet 6 as an upper surface and a thermoplastic foamed sheet 5 provide under the PVC sheet 6, the height of the emblem will be higher than that of the emblem illustrated in FIG. 1, in other words, the emblem will be more bulky. Also, the surface of the emblem will be more smooth.

If the adhesion layer 8 under the back-up layer 7 is a tacky adhesion sheet, it can be easily to adhere to metal, hard synthetic resin and wood etc. Alternatively, if the adhesion layer 8 is a hot melt film, it can strongly adhere to textile and synthetic lather etc.

The adverse effect of hydrogen chloride gas and chlorine gas on the metal vapor deposition film 2 can be completely eliminated by arranging a polyurethane type hot melt film between the pattern sheet 4 and the back-up layer 7.

As described above, the present invention uses a transparent thermoplastic synthetic resin film with the vapor deposited metal film and thus with a highly shining effect, and a thermoplastic PVC sheet which is easily moldable. Although a method of manufacturing an emblem according to the invention in which high frequency induction is applied to such material, the final product is protected against oxidation and corrosion of the vapor-deposited metal film by hydrogen chloride gas and chlorine gas due to the non-porous urethane resin film so as to make it brightly shine.

An emblem manufactured by a method according to the invention can be securely attached to a curved and non-smooth surface of an object such as an automobile, a motor bicycle, a home electric appliance or a textile product regardless of the curvature and without difficulty.

A method according to the invention can suitably be used to manufacture an emblem carrying a complicated pattern such as a letter or a flower where components of the pattern are separated from each other can be arranged precisely in place between a single carrier film and a single releasing paper sheet.

With a method according to the invention, the polyurethane film formed with a metal vapor deposition film extends as it is heated and pressed. Thus, the side or the boundary of the pattern is covered with such film with the metal vapor deposition film, so that the boundary portion shines as brightly as the remaining areas of the pattern to enhance the decorating effect of the emblem. If aluminum or chromium is used for vapor deposition, the emblem can carry any metallic color tone by printing the surface with transparent ink. This advantage is particularly remarkable when combined with the esthetic effect of an undulated surface of the outermost polyurethane film.

Finally, since an emblem manufactured by a method according to the invention is made of relatively soft thermoplastic synthetic resin films and sheets, it is safe to the human body. In addition, the surface of the emblem is made of a polyurethane top film, it has an excellent resistivity against adverse effects of light and weather so that it maintains its esthetic appearance for a prolonged period of time.

What is claimed is:

1. A method of manufacturing an emblem comprising steps of:

arranging a composite sheet on a pole plate of an electrode die for high frequency induction, said composite sheet comprising a pattern sheet, a back-up layer of thermoplastic synthetic resin arranged under the pattern sheet, a tacky adhesion layer arranged under said pattern sheet, a releasing paper sheet arranged under said tacky adhesion layer and a highly heat-resistant transparent carrier film, said pattern sheet comprising a transparent polyurethane film, a metal vapor deposition film formed under a lower surface of said transparent polyurethane film and a polyurethane film arranged under a lower surface of said metal vapor deposition film to cover said metal vapor deposition film;

pressing and heating said composite sheet from above by means of an engraving die to fusion-cut said pattern sheet and said back-up layer between said carrier film and said releasing paper sheet at least along the outer boundary off the pattern and weld them together;

peeling off either said carrier film or said releasing paper sheet;

removing an unnecessary areas of the pattern; and bonding the peeled off carrier film or releasing paper sheet again.

2. The method according to claim 1, wherein said back-up layer comprises a thermoplastic PVC sheet.

3. The method according to claim 1, wherein said highly heat-resistant transparent carrier film comprises a polypropylene film.

4. The method according to claim 1, further comprising in advance forming an undulated pattern on an upper surface of said heat-resistant transparent polyurethane film with said metal vapor deposition film thereunder.

5. The method according to claim 1, wherein the undulated pattern on the upper surface of the transparent polyurethane film is formed by pressing and heating the transparent polyurethane film with an engraving die.

6. The method according to claim 1, wherein the back-up layer of thermoplastic synthetic resin comprises a thermoplastic PVC film.

7. The method according to claim 1, wherein the back-up layer of thermoplastic synthetic resin comprises a thermoplastic foamed PVC sheet.

8. The method according to claim 1, wherein the back-up layer of thermoplastic synthetic resin comprises an upper layer of a thermoplastic PVC and a lower layer of a thermoplastic foamed PVC sheet.

9. The method according to claim 1, wherein the back-up layer of thermoplastic synthetic resin comprises an upper layer off a thermoplastic foamed PVC sheet and a lower layer made of a thermoplastic PVC film.

10. The method according to claim 1, wherein said adhesion layer under the lower surface of the back-up layer is a tacky adhesion sheet.

11. The method according to claim 1, wherein said adhesion layer under the lower surface of the back-up layer is a hot melt film.

12. The method according to claim 1, wherein a polyurethane type hot melt film is arranged between the pattern sheet and the back-up layer.

* * * * *